UNITED STATES PATENT OFFICE.

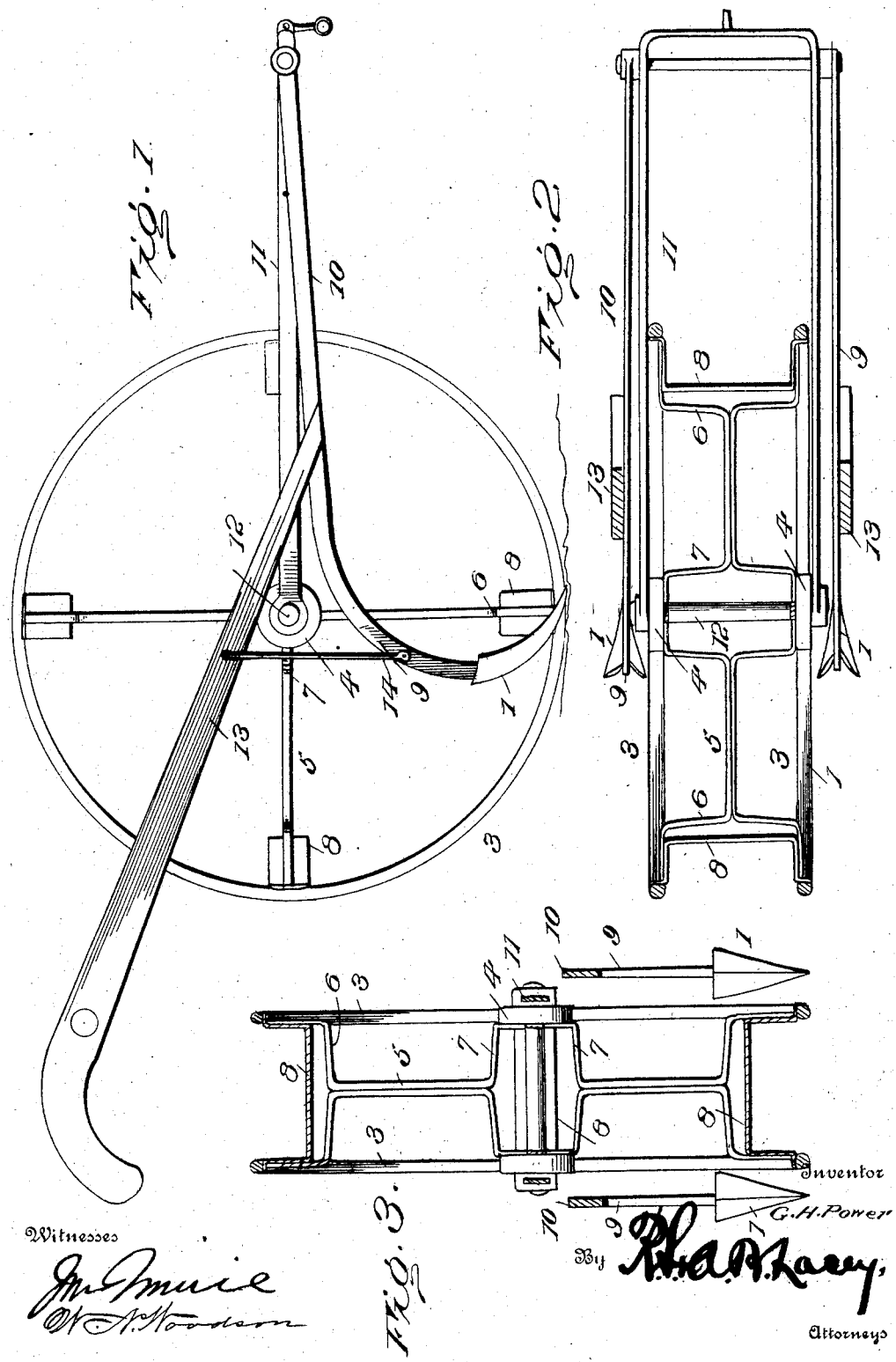

GEORGE H. POWER, OF CHANDLER, OKLAHOMA TERRITORY.

COTTON CULTIVATOR AND THINNER.

No. 864,191.　　　　Specification of Letters Patent.　　　　Patented Aug. 27, 1907.

Application filed October 29, 1906. Serial No. 341,107.

*To all whom it may concern:*

Be it known that I, GEORGE H. POWER, a citizen of the United States, residing at Chandler, in the county of Lincoln and Territory of Oklahoma, have invented certain new and useful Improvements in Cotton Cultivators and Thinners, of which the following is a specification.

Cotton, as is well known, is planted for the most part in rows and after attaining a certain height is required to be cultivated and thinned so as to leave one or more plants about eighteen to twenty inches apart in each of the rows.

The purpose of the present invention is to devise a novel machine for performing both operations at one time, the machine being of such organization as to throw the earth over the plants to be destroyed and to protect such plants as are required to be left standing to reach maturity.

The machine consists of cultivator shovels for throwing the earth inward towards a medial line so as to cover the rows of plants, and fenders for protecting such plants as are to remain.

For a full description of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a side elevation of an implement embodying the invention. Fig. 2 is a top plan view thereof. Fig. 3 is a vertical transverse section of the implement.

Corresponding and like parts are referred to in the following description and indicated in all the views of the drawings by the same reference characters.

The machine comprises, essentially, oppositely disposed cultivator shovels 1 arranged so that earth is thrown inward to cover a stand of cotton and a rotary carrier provided with fenders to protect such plants of the rows as are to remain standing at regular intervals. The rotary carrier is of circular form and comprises companion wheels or rims 3 transversely spaced about eight to twelve inches more or less so as to straddle the rows of cotton, that is, to have one rim of the carrier travel upon one side of a row and the other rim travel upon the opposite side of the said row. As shown, the rotary carrier comprises a hub 4, spokes 5 and a rim 3 comprising two laterally spaced rings. The spokes are provided in pairs and the spokes of each pair lie close together throughout their length and have opposite end portions outwardly curved, as shown at 6 and 7 to form arches which span the spaces formed, respectively, between the spaced members of the rim 3 and the members of the hub 4. At suitable intervals in the circumferential length of the carrier, fenders 8 are arranged, said fenders being of arch form and of a length to connect the opposite members of the rim 3 by means of which they are supported, the width of said fenders being from four to six inches more or less according to the amount of the cotton rows to be protected or shielded. These fenders are of arch form and are arranged to occupy a vertical position when at the lowest point of the rotary carrier so as to extend over the plants and prevent the cultivator shovels 1 from throwing the earth upon the plants and covering the same.

A U-shaped draft frame 11 is provided, the two longitudinal side pieces of the same having an axle 12 upon which the rotary carrier is mounted journaled between the rear portions thereof. A transverse shaft extends across the forward portion of the draft frame 11 adjacent the cross bar thereof, the extremities of the shaft projecting beyond the sides of the frame and having the shovel carrying frame connected thereto. This shovel carrying frame comprises rearwardly extending beams 10, the end portions of which are curved downwardly to form the standards 9 upon which the cultivator shovels 1 are mounted. With this construction, it will be readily apparent that by swinging the shovel carrying frame the cultivator shovels 1 can be moved vertically with respect to the draft frame and rotary carrier.

The draft is adapted to be applied to the frame 11 in any accustomed way. Handle bars 13 are connected at their lower front ends to the cultivator beams 10 and are stayed by means of braces 14 which have connection at their lower ends with the said beams 10 and at their upper ends with the handle bars intermediate of their ends.

In operation the implement is drawn over the field after the cotton has reached the required height in such a manner that the rims of the rotary carrier travel upon opposite sides of the row to be thinned. As the implement advances, the cultivator shovels 1 loosen the earth and throw the same inward upon the plants which are smothered and subsequently die. In the rotation of the part 2, the fenders 8 are successively brought in position to protect or shield certain plants of the row at regular intervals, the earth being thrown upon such fenders, which prevent the covering of the plants over which they extend. As the rotary carrier 2 moves, the fenders rise and throw the earth to one side, thereby leaving the protected plants standing to mature. It will thus be understood that the rows of cotton are both cultivated and thinned at one operation, the plants covered dying by being smothered and serving as means for fertilizing the soil.

It is to be understood that while it is preferred to construct the implement for independent use, nevertheless, if so desired it may be connected to a cultivator or other implement in any desired way, such as by lashing, whereby the two may be drawn over the field together. In the latter instance the device will be used as an attachment.

Having thus described the invention, what is claimed as new is:

1. In an implement of the character set forth, the combination of a U-shaped draft frame, a rotary carrier journaled between the opposite sides of the draft frame, a fender carried by the rotary carrier, a shovel carrying frame pivotally connected to the forward end of the draft frame, cultivator shovels carried by the shovel carrying frame upon opposite sides of the rotary carrier, and means for controlling the movements of the shovel carrying frame.

2. In an implement of the character set forth, the combination of a U-shape draft frame, a rotary carrier journaled between the sides of the frame, a fender carried by the carrier, a transverse shaft connecting the opposite sides of the draft frame adjacent the cross bar at the forward end thereof, a shovel carrying frame comprising rearwardly extending beams having their forward ends connected to the transverse shaft, cultivator shovels carried by the rear ends of the beams, and handles mounted upon the beams for controlling the swinging movement of the shovel carrying frame.

3. In an implement of the character set forth, the combination of a frame, a rotary carrier journaled in the frame and comprising a hub, a rim composed of laterally spaced rings, and spokes arranged in pairs, the spokes of each pair lying close together throughout their length and having opposite end portions arched to span the spaces between the members of the rim and hub, fenders connecting the spaced rings of the rim, and means carried by the frame for loosening the earth and throwing the same inward.

In testimony whereof I affix my signature in presence of two witnesses.

GEORGE H. POWER. [L. S.]

Witnesses:
J. C. HERR,
A. A. POWER.